No. 648,599. Patented May 1, 1900.
A. W. SHANK.
STREET CAR FENDER.
(Application filed Aug. 11, 1899.)
(No Model.)
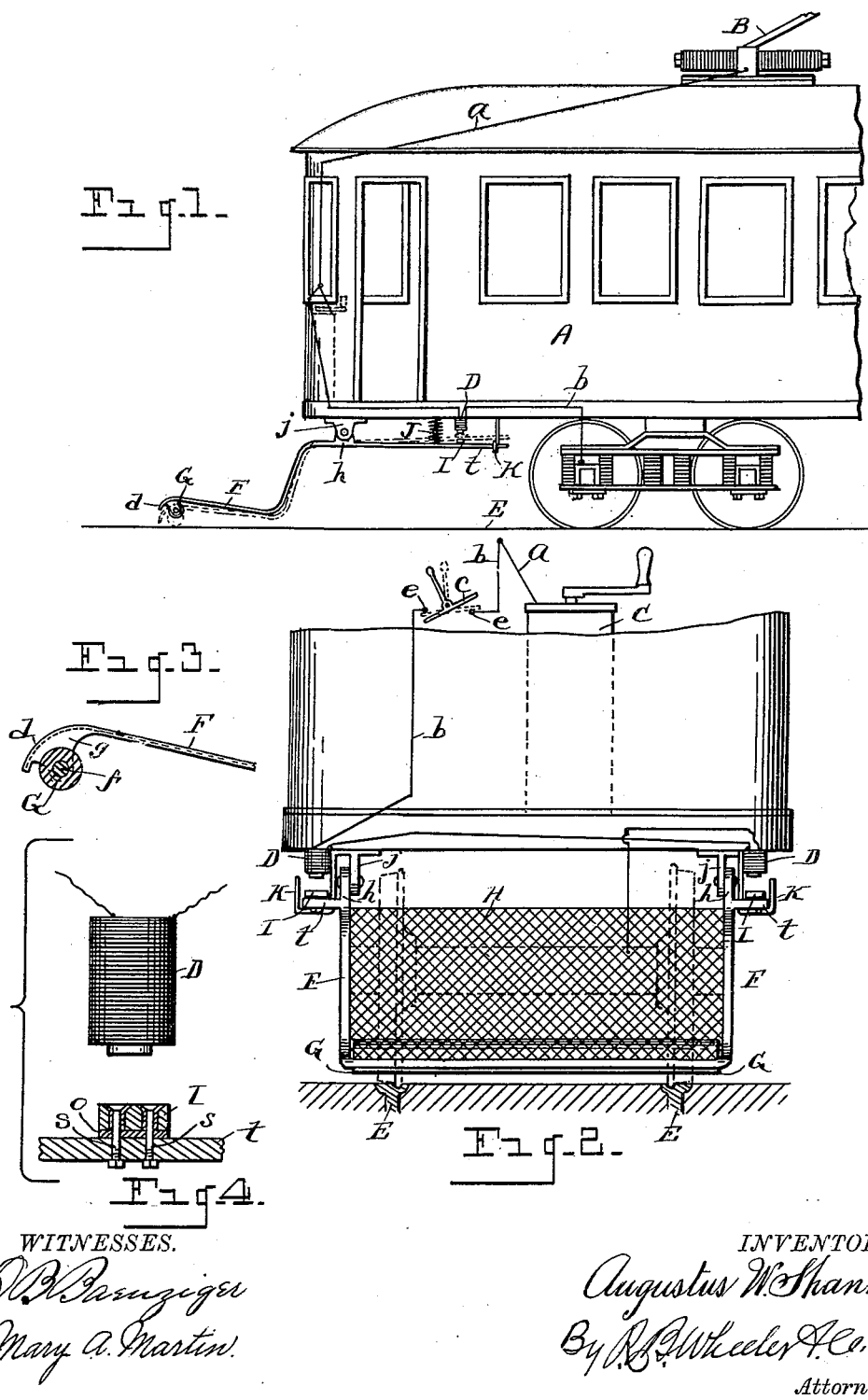
WITNESSES.
INVENTOR.
Augustus W. Shank
By R. S. Wheeler & Co.
Attorneys

UNITED STATES PATENT OFFICE.

AUGUSTUS W. SHANK, OF DETROIT, MICHIGAN, ASSIGNOR OF ONE-EIGHTH TO CHARLES A. BERGER, OF SAME PLACE.

STREET-CAR FENDER.

SPECIFICATION forming part of Letters Patent No. 648,599, dated May 1, 1900.

Application filed August 11, 1899. Serial No. 726,380. (No model.)

*To all whom it may concern:*

Be it known that I, AUGUSTUS W. SHANK, a citizen of the United States, residing at Detroit, in the county of Wayne, State of Michigan, have invented certain new and useful Improvements in Street-Car Fenders; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in car-fenders especially designed for use on street-cars; and it consists in the construction and arrangement of parts hereinafter fully set forth, and pointed out particularly in the claims.

The object of the invention is to provide simple and efficient means for throwing downward the forward end of the fender, so that a person struck thereby will be picked up and carried by the fender and not rolled thereunder, the arrangement being such as to enable the motorman to quickly operate the fender to depress the forward end thereof when necessary and easily and readily restore the fender to its normal position. This object is attained by the mechanism illustrated in the accompanying drawings, in which—

Figure 1 is an elevation of a portion of an electrically-propelled street-car wherein the trolley system is employed, showing the application of my improved fender to said car and an electric circuit leading from the trolley-stand, in which circuit are located two powerful electromagnets, through the energizing of which the pivoted fender is adapted to be actuated. Fig. 2 is a front elevation of Fig. 1, the top of the car being broken away and showing a switch whereby the circuit, including said electromagnets, may be closed by the motorman when it is desired to operate the fender. Fig. 3 is an enlarged detail in section through the forward end of the fender, showing a bearing-roller journaled therein. Fig. 4 is an enlarged detail, partly in section, showing one of the electromagnets and its insulated armature mounted on the rearwardly-extending bar of the fender.

Referring to the letters of reference, A designates the car, which may be of any suitable construction, and B the trolley-pole, which is adapted to carry a trolley-wheel running in electrical contact with an overhead conductor. (Not shown.) Leading from the stand of the trolley-pole is an electrical conductor *a*, which conveys the current from the trolley-pole to the ordinary switch C in circuit with the driving-motor and the rails of the track through the medium of the wheels, as is well understood.

Branching from the conductor *a* is a conductor *b*, forming a line in which the electromagnets D are included and which leads to the axle of a truck and thence to the rail E of the track, which forms a return-conductor to the source of power as commonly practiced. The line or circuit formed by the conductor *b* is normally open and is adapted to be closed by the switch *c* through the contact-point *e*, as shown by dotted lines in Fig. 2.

F designates the fender, which comprises a trilateral frame whose forward end curves downwardly and forwardly and crosses the track transversely adjacent to the rails thereof. The extreme outer end of the frame of the fender is curved downwardly, as at *d*, forming a sort of a housing or guard for a bearing-roller G, which is journaled upon a shaft *f*, whose ends are supported in brackets *g*, secured to the frame of the fender. The curved portion of the fender-frame serves as a guard to prevent any one from falling onto the roller when struck by the fender. Crossing between the bars of the fender-frame is a suitable netting H, as clearly shown in Fig. 2.

The bars of the fender-frame near their longitudinal center are provided with upwardly-extending ears *h*, which are pivoted to the brackets *j*, depending from the frame of the car, whereby the fender is pivotally hung from said brackets. The electromagnets D are mounted upon the under face of the car-frame, immediately above the rearwardly-extending ends *t* of the bars of the fender. Located on the upper face of said bars are the armatures I of said electromagnets, which are always within the field of said magnets and are insulated from said bars by a strip of insulating material $o$, as clearly shown in Fig. 4, said armatures being held in place by the screw-bolts $s$.

Should the motorman discover a person upon the track liable to be struck by the car, he will at the time of shutting off the electric current from the motor throw the switch $c$, so as to close the line $b$, causing a strong current to pass through and energize the electromagnets D, thereby attracting the armatures I and swinging the fender to depress the forward end thereof, so as to bring the roller D in contact with the surface between the rails of the track, as shown by dotted lines in Fig. 1, in which position of the fender a person struck by the car and knocked down upon the track will be picked up and carried upon the fender and not rolled thereunder, as is often the case where the forward end of the fender is supported some distance above the track.

After the car has been brought to a stop the switch $c$ is swung so as to open the line $b$, when the forward end of the fender will be raised sufficiently to carry the roller G from the track through the medium of the coiled springs J, interposed between the bars of the fender and the frame of the car.

Depending from the car-frame are the supporting-hooks K, which engage the rear ends of the bars of the fender to maintain them properly in place.

Having thus fully set forth this invention, what is claimed is—

1. In a car-fender, the combination of a car, a fender pivoted thereon having a projecting forward end and horizontally-extending rear ends, an electric circuit leading directly from the trolley-pole to the wheels of the car independent of the motor-circuit, electromagnets included in said circuit, armatures on the ends of said fender within the field of said magnets, and a switch adapted to be operated manually in closing said circuit.

2. In a car-fender, the combination of a car, a fender pivoted on the car carrying a roller at its forwardly-projecting end, the rear end of said fender extending approximately parallel to the frame of the car, a normally-open electric circuit independent of the motor-circuit, electromagnets included in said circuit located adjacent to the rearwardly-projecting ends of the fender-frame, armatures to said magnets located upon the projecting ends of said frame, a switch adapted to close the circuit including said electromagnets, and a spring interposed between the rearwardly-extending ends of the fender-frame and the frame of the car.

In testimony whereof I sign this specification in the presence of two witnesses.

AUGUSTUS W. SHANK.

Witnesses:
E. S. WHEELER,
M. A. MARTIN.